United States Patent [19]

Kato et al.

[11] Patent Number: 4,509,830

[45] Date of Patent: Apr. 9, 1985

[54] LIGHT BEAM SEPARATION METHOD

[75] Inventors: Kiichi Kato; Tohru Musha; Kenichi Ito, all of Hachioji, Japan

[73] Assignee: Olympus Optical Co., Ltd., Japan

[21] Appl. No.: 345,154

[22] Filed: Feb. 2, 1982

[30] Foreign Application Priority Data

Feb. 7, 1981 [JP] Japan .................................. 56-16293

[51] Int. Cl.³ ............................................. G02B 27/10
[52] U.S. Cl. ..................................... 350/394; 350/172
[58] Field of Search ............... 350/169, 170, 171, 173, 350/394, 395, 172

[56] References Cited

U.S. PATENT DOCUMENTS 2,222,300 11/1940 Pistor et al. ......................... 350/170
2,274,110 2/1942 Ward, Jr. ............................. 350/173
3,800,298 3/1974 Ogora et al. ....................... 350/3.86

Primary Examiner—Bruce Y. Arnold
Attorney, Agent, or Firm—Parkhurst & Oliff

[57] ABSTRACT

A method of separating at least two light beams propagating in the substantially same direction but which propagate with making a small angle therebetween is disclosed, which comprises making one of said light beams incident upon an interface between an isotropic first optical medium having a first refractive index and an isotropic second optical medium having a second refractive index lower than said first refractive index at an incident angle substantially equal to the Brewster angle so that the light beam is substantially totally transmitted through said interface; and making the other light beam incident upon said interface at an incident angle greater than the critical angle so that the light beam is totally reflected by said interface.

8 Claims, 6 Drawing Figures

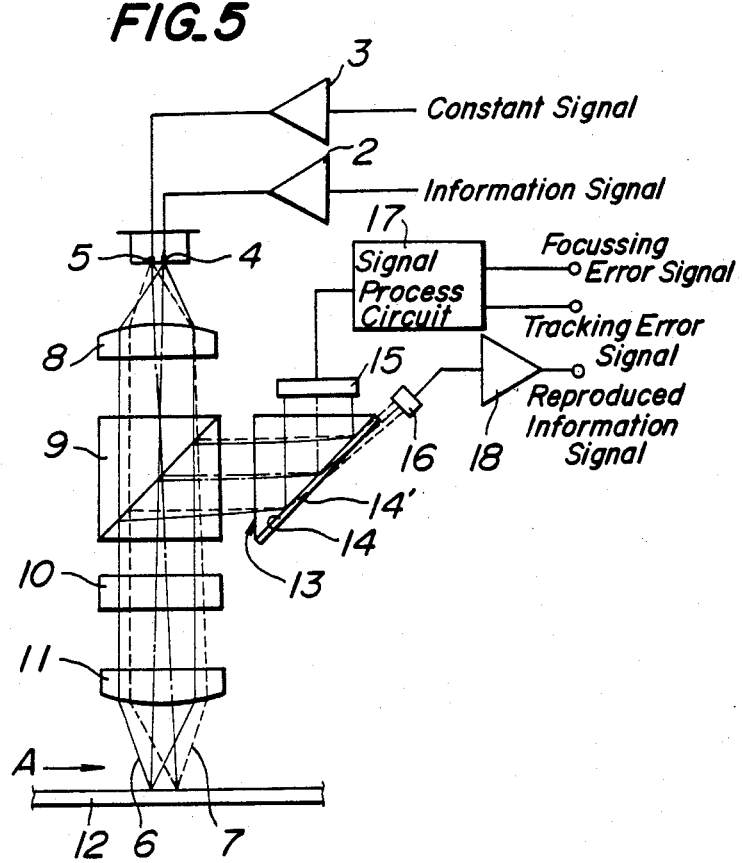
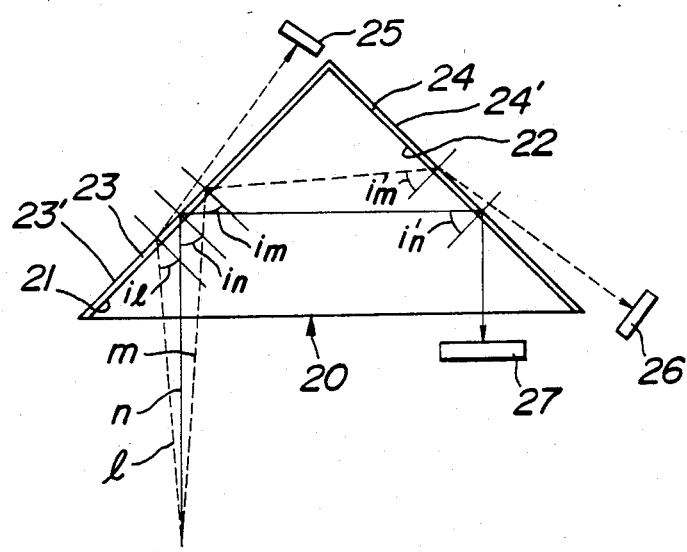

LIGHT BEAM SEPARATION METHOD

BACKGROUND OF THE INVENTION

1. Field of the Invention

This invention relates to a method of separating and detecting plural light beams propagating in the substantially same direction but which propagate with a small angle therebetween, and more particularly to a method of separating plural light beams, which are substantially parallel to each other, by means of an optical information reading apparatus such as a video disc, a digital audio disc or the like.

2. Description of the Prior Art

Heretofore, there has been known an information reading apparatus wherein a scanning light spot is projected by an objective lens onto information tracks formed spirally or concentrically in, for example, a record medium to read information which had been recorded along the tracks. An example of the record medium having information tracks is the so-called video disc. In this type of the video disc, encoded video and/or audio signals are recorded as optical information such as optical transmissivity, reflection and phase properties. The information recorded on the video disc is read out by focussing a laser beam emitted from a laser light source onto the tracks of the disc through the objective lens as a light spot while rotating the disc at a high speed, and then detecting the transmitted or reflected light beam modulated by the information track. One of important properties of such a record medium is a very high density of recorded information and thus the width of the information track is very narrow and also the space between successive information tracks or the track pitch is very narrow. In order to correctly pick-up the recorded information from tracks having a narrow width and pitch, the laser beam must follow the information tracks. To this end, an error in the position of the light spot with respect to the information track, i.e. a tracking error is detected to produce a tracking error signal and as a result, the light spot is moved in a direction perpendicular to the optical axis of the objective lens and the information track in accordance with the detected tracking error signal. In order to perform such a tracking servo control, there is used a two-beam system or a three-beam system using two or three laser beams substantially in parallel with each other. When such plural laser beams are simultaneously projected onto the record medium, it is necessary that the light beams transmitted through or reflected by the record medium are separated individually and detected by means of plural separate light detectors.

Known methods for separating plural light beams include a method of spatially separating light beams by enlarging a magnification of an optical system and a method of separating light beams which have different wavelengths by a dichroic mirror and the like.

In the former case, however, the light path length must be made large, resulting in the optical system being too large. In the latter case, it is necessary to use light sources having sufficiently different wavelengths, so that it is difficult to use a semiconductor laser or the like.

SUMMARY OF THE INVENTION

It is an object of the invention to eliminate the above mentioned drawbacks and to provide a light beam separation method suitable for effectively separating plural light beams propagating in the substantially same direction but which propagates with a small angle therebetween without making a large apparatus.

According to the invention, a method of separating at least two light beams propagating in the substantially same direction but which propagates with a small angle therebetween comprises making one of the light beams incident upon an interface between a first optical medium having a first refractive index and a second optical medium having a second refractive index lower than the first refractive index at an incident angle substantially equal to the Brewster angle so that the light beam is transmitted through the interface; and making the other light beam incident upon the interface at an incident angle greater than the critical angle so that the light beam is totally reflected by the interface.

BRIEF DESCRIPTION OF THE DRAWINGS

The invention will now be described in detail with reference to the accompanying drawings, wherein:

FIG. 5 is a schematic view illustrating an embodiment of the optical system used for practicing the light beam separation method according to the invention; and FIG. 6 is a schematic view illustrating an embodiment of the prism used for practicing the light beam separation method according to the invention.

DESCRIPTION OF THE PREFERRED EMBODIMENTS

Figure 1:
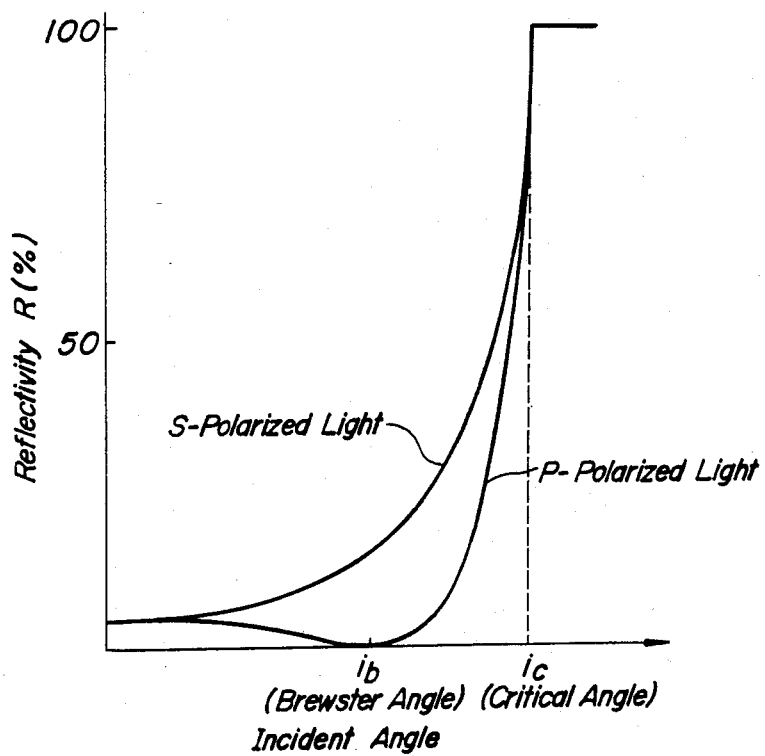
FIG. 1 is a graph showing the relationship between incident angle and reflectivity at an interface between a first optical medium having a first refractive index and a second optical medium having a second refractive index lower than the first refractive index.

In FIG. 1 there is schematically shown an embodiment of the relationship between incident angle and reflectivity at an interface between a first optical medium having a first refractive index and a second optical medium having a second refractive index lower than the first refractive index when a light beam is propagated from the first optical medium to the second optical medium. The term "interface" used herein means an optical surface serving as both reflection and refraction surfaces. In FIG. 1, $i_c$ represents the critical angle and $i_b$ represents the Brewster angle. The incident light beam is totally reflected when the incident angle is near the critical angle. Moreover, when the light beam is a P-polarized light, the reflectivity becomes zero at an incident angle substantially equal to the Brewster angle.

Figure 2:
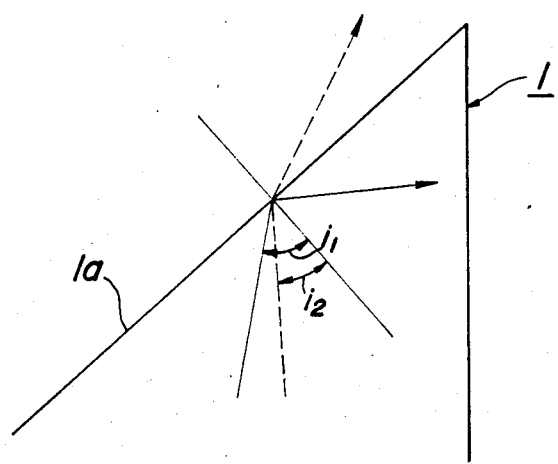
FIG. 2 is a schematic view illustrating the principle of the light beam separation method according to the invention.

The principle of the light beam separation method according to the invention is schematically illustrated in FIG. 2, wherein two light beams to be separated are made incident as parallel light fluxes at incident angles $i_1$ and $i_2$ with respect to a reflection surface $1a$ of a prism 1 constituting the interface between the first and second optical media, respectively. In this case, if the light beam is P-polarized with respect to the polarizing reflection surface of the prism 1 and the angle $i_1$ is near the critical angle and the angle $i_2$ at the Brewster angle, one of the two light beams (shown by a solid line) is totally reflected by the reflection surface 1a, while the other light beam (shown by a broken line) is totally transmitted through the reflection surface 1a. In this way, the two light beams can be separated in different directions.

When the prism acting as the first optical medium is made of a common glass having a refractive index of $n=1.5$, the critical and Brewster angles are $i_c=41.81°$ and $i_b=33.69°$, respectively, so that the difference in the incident angle between the separable two light beams, i.e. the value of $i_c-i_b$ is above 8°. When using a glass having a higher refractive index, the value of $i_c-i_b$ can be made smaller, so that the two light beams, whose optical axes are slightly deviated with each other, can be further separated.

In another preferred embodiment of the prism, the value of $i_c-i_b$ can be made even smaller by adhering a thin film to the reflection surface 1a of the prism 1. Particularly, when the thickness of this thin film is selected to satisfy $\lambda/4n_1 \cos \theta$ in which $\theta$ is an incident angle near the critical angle, $\lambda$ is a wavelength of a light beam and $n_1$ is a refractive index of the thin film, the value $i_b$ approaches the value $i_c$.

Figure 3:
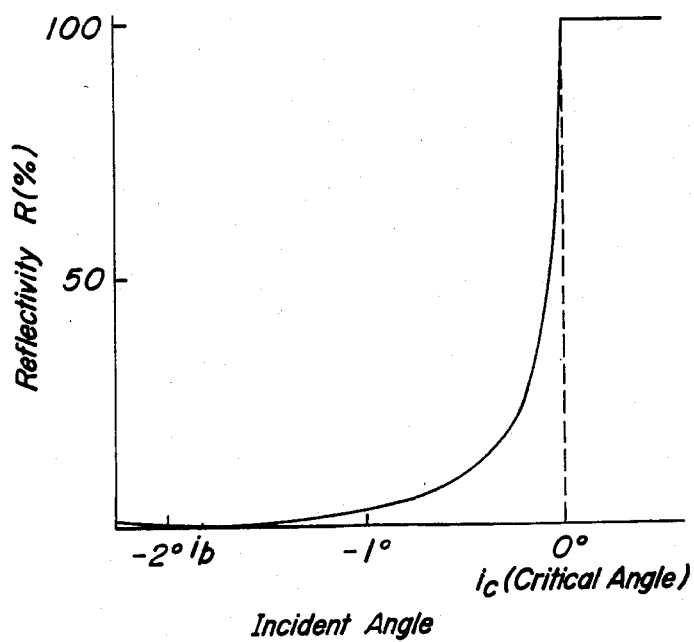
FIG. 3 is a graph showing a change of a reflectivity on an incident angle when $TiO_2$ is adhered to a reflection surface of a prism.
Figure 4:
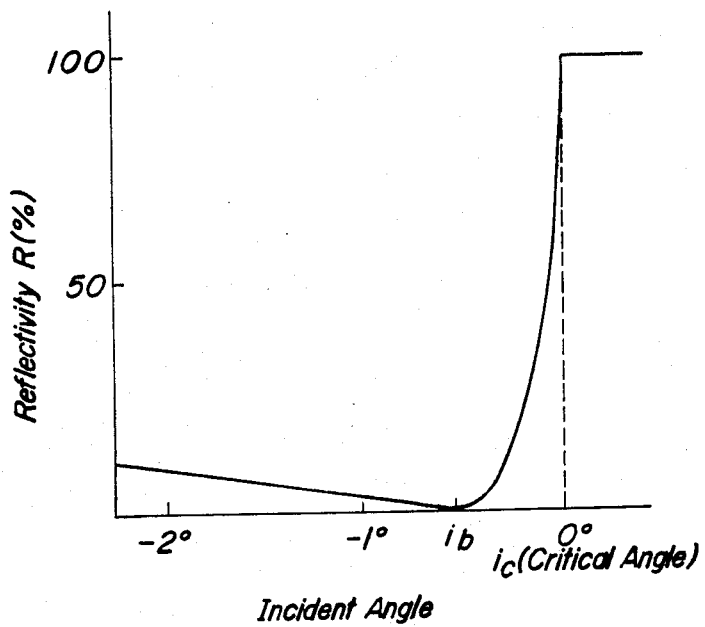
FIG. 4 is a graph showing a change of a reflectivity on an incident angle when $TiO_2$, $MgF_2$ and $TiO_2$ are adhered in this order to a reflection surface of a prism.

FIG. 3 is a graph showing a change of a reflectivity on an incident angle when a thin film of $TiO_2$ (refractive index $n=2.5$) with a thickness of 90.6 nm is adhered to a reflection surface of a glass having a refractive index $n=1.5$ as a prism, wherein the incident angle is plotted on an abscissa, provided that the critical angle is a standard (zero degree), and the reflectivity R is plotted in % on an ordinate. As apparent from this graph, the value of $i_c-i_b$ is about 1.8°. Further, FIG. 4 is a graph showing a change of a reflectivity on an incident angle when a three-layer film of $TiO_2$ (refractive index $n=2.5$) with a thickness of 90.6 nm, $MgF_2$ (refractive index $n=1.4$) with a thickness of 211.8 nm, and $TiO_2$ with a thickness of 90.6 nm are adhered to a reflection surface of a glass having a refractive index $n=1.5$ as a prism. As apparent from this graph $i_b$ further approaches to $i_c$ and the value of $i_c-i_b$ may be about 0.5°. Thus, the value of Brewster angle $i_b$ may be set at an optional value by properly selecting the thickness of the thin film and the refractive indices of the thin film and the first optical medium, so that light beams propagating in the substantially same direction but which propagate with making a very small angle therebetween can easily be separated.

In FIG. 5 there is schematically illustrated an embodiment of the optical system used for practicing the light beam separation method according to the invention. In this embodiment, for instance, when information is recorded onto an optical record medium such as a metal thin film or the like by a laser beam, it may be required to immediately reproduce and monitor the recorded information in order to judge the quality of the recorded information.

In the illustrated optical system, a recording polarized light beam 6 (shown by a solid line) and a reproducing polarized light beam 7 (shown by a broken line), which are P-polarized light beams propagating in substantially the same directions but which propage with a small angle therebetween in this embodiment, are emitted from laser light sources 4 and 5 driven by laser drivers 2 and 3, respectively. Then, these two light beams are converted into parallel light fluxes by a collimator lens 8 and made incident upon an objective lens 11 through a polarizing beam splitter 9 and a quarter-wavelength plate 10. Thereafter, these parallel light fluxes are focussed on a record medium 12 by means of the objective lens 11 as light spots. Since the record medium 12 moves in a direction shown by an arrow A in FIG. 5, i.e. information tracks of the record medium 12 extend in the arrow direction A, the light spot for the reproducing light beam 7 is made to locate in front of the light spot for the recording light beam 6 (i.e. right-hand side of FIG. 5).

The light beams reflected by the record medium 12 are collected by the objective lens 11 and made incident upon the polarizing beam splitter 9 through the quater-wavelength plate 10. A prism 13 provided with a thin film 14 as described above is arranged at a side of the polarizing beam splitter 9 in such a manner that an interface 14' of the prism 13 is set at an angle near the critical angle with respect to the incident light beam 6 and at an angle substantially equal to the Brewster angle with respect to the incident light beam 7. Therefore, the light beam 6 is totally reflected by the interface 14', while the light beam 7 is transmitted through the interface 14'. The reflected light beam 6 and transmitted light beam 7 are detected by light detectors 15 and 16 disposed above and obliquely above the prism 13, respectively.

Moreover, an entrance surface opposite to the interface 14' is depicted in a direction parallel to the plane of the drawing of FIG. 5, but is should be rotated by 90° to get in a direction perpendicular to the plane of the drawing in order to obtain a tracking error signal as a matter of fact.

In the optical system of the above construction, the recording and reproducing light beams 6 and 7 emitted from the laser light sources 4 and 5 are focussed on the record medium 12 through the collimator lens 8, polarizing beam splitter 9, quarter-wavelength plate 10 and objective lens 11. As a result, the recording light beam 6 records the informations onto the record medium moving in the arrow direction A as an array of pits, while the light beam for the recording light beam 6 reflected by the record medium is collected by the objective lens 11 and transmitted through the quarter-wavelength plate 10. Since the recording light beam 6 has been passed through the quarter-wavelength plate 10 twice, the reflected light beam is converted into S-polarized light, which is reflected by a polarizing surface of the polarizing beam splitter 9. Since the interface 14' of the prism 13 is set at an angle near the critical angle with respect to this reflected light beam, the recorded light beam 6 is totally reflected by the interface 14' and detected by the light detector 15 located above the prism 13. On the other hand, the reproducing light beam 7 projected onto the record medium 12 is modulated in accordance with the pit signal recorded on the information track of the record medium, which is again collected by the objective lens 11 and transmitted through the quater-wavelength plate 10 to convert it into S-polarized light and it is reflected by the polarizing surface of the polarizing beam splitter 9. Since the interface 14' of the prism 13 is set at an angle substantially equal to the Brewster angle with respect to this reflected light beam, the reproduced light beam 7 is transmitted through the interface 14' and detected by the light detector 16 located obliquely above the prism 13. In this way, the two light beams 6, 7 can be separated at the interface 14'.

Moreover, when the light detector 15 has four light receiving regions divided along two orthoganal directions, outputs from this detector can be procesed by a signal process circuit 17 in the same focus detection method as proposed in U.S. patent application Ser. Nos. 195,075, 292,929 and 292,930 to produce focussing and tracking error signals, which drive the objective lens 11 to effect the focussing and tracking servo controls. On the other hand, an output from the light detector 16 can be amplified by an amplifier 18 to produce a reproduced signal of the recorded information, whereby the state of the recorded information can be monitored.

In the illustrated embodiment, the parallel light flux is obtained by arranging the collimator lens 8 between the laser light source and the polarizing beam splitter, but the invention is not limited to the embodiment explained above. For instance, the light beam made incident upon the prism 13 may be obtained as substantially parallel light flux by arranging the collimator lens 8 between the polarizing beam splitter 9 and the quarter-wavelength plate 10 and placing a concave lens having the same focus as the collimator lens 8 between the polarizing beam splitter 9 and the prism 13.

Next, an example of numerical values for the embodiment illustrated in FIG. 5 will be given. When the focal length of the objective lens 11 is 5 mm and the distance between the light spots for the recording and reproducing light beams 6 and 7 recorded on the record medium 12 is 50 μm, an inclination angle between the optical axes of the light beams reflected by the polarizing surface of the polarizing beam splitter is about 0.6°. When the refractive index of the prism 13 is 1.5, an inclination angle between the optical axes of the reflected light beams impinging upon the interface 14' is about 0.4°. If a five-layer thin film is adhered to the reflection surface of the prism 13, the value of $i_c - i_b$ is about 0.15°. Therefore, when one of the two light beams has an incident angle substantially equal to the Brewster angle, the other light beam can be set at an incident angle near the critical angle.

In FIG. 6 there is schematically shown an embodiment of the prism used for practicing the light beam separation method according to the invention. As the tracking control method in a video or a audio disc player, there is known a three-beam system using three light beams, whose optical axes are slightly different from each other. In this embodiment, these three light beams can be separated and detected easily.

To first and second reflection surfaces 21 and 22 of a prism 20 are adhered thin films 23 and 24 each made of a material having a refractive index higher than that of the prism 20. First, three light beams l, m and n having slightly different optical axes from each other are made incident upon a first interface 23' of the prism 20, wherein the incident angles of these light beams are $i_l$, $i_m$ and $i_n$, respectively. In order to separate the light beam l from the other light beams, $i_l$ is set at an angle substantially equal to the Brewster angle with respect to the first interface 23', while $i_m$ and $i_n$ are set at angles near the critical angle with respect to the first interface 23'. Therefore, 100% of the light beam l is transmitted through the first interface 23' and detected by a light detector 25 located near the prism 20, while the light beams m and n are totally reflected by the first interface 23'.

Then, the light beams m and n reflected by the first interface 23' are made incident upon a second interface 24' of the prism 20 at incident angles $i'_m$ and $i'_n$. In this case, $i'_m$ is set at an angle substantially equal to the Brewster angle with respect to the second interface 24' and $i'_n$ is set at an angle near the critical angle with respect to the second interface 24'. As a result, 100%-of the light beam m is transmitted through the second interface 24', while the light beam n is totally reflected by the second interface 24'. The transmitted light beam m and reflected light beam n are detected by light detectors 26 and 27 each located near the prism 20, respectively. In this way, three light beams having slightly different optical axes from each other can be separated and detected easily. Moreover, the light detectors 25, 26 and 27 can spatially and freely be separated apart from each other.

According to the light beam separation method of the invention, plural light beams having slightly different optical axes from each other can be changed in sufficiently different directions by making these light beams incident upon an interface between a first optical medium having a first refractive index and a second optical medium having a second refractive index lower than the first refractive index at an incident angle corresponding to the Brewster angle and an incident angle near the critical angle. In this case, when a thin film is adhered to the interface, light beams having a smaller difference between their optical axes can be separated and detected easily. Furthermore, plural light beams can be separated without making a light path of an optical system long, so that the optical system may be made compact. Moreover, the use of dichroic mirror is not required for the separation of light beams, so that semiconductor laser and the like can be utilized advantageously.

The invention is not limited to the embodiments explained above, but may be modified in various ways within the scope of the invention. For instance, the incident angles to the interface are not necessary to be strictly set at Brewster angle and an angle near the critical angle, but they are practically allowed to be set at an angle near the Brewster angle and an angle substantially equal to or larger than the critical angle. Furthermore, plural light beams may be produced from at least one light source or by using a diffraction grating or the like. Moreover, if it is intended to increase the number of light beams to be separated, the number of the interfaces can to be increased in accordance with the increased number of light beams.

What is claimed is:

1. A method of separating at least two light beams, at least one of which is plane polarized, propagating in substantially the same direction but which propagate with a small angle therebetween, comprising:

making said at least one plane-polarized light beam be incident upon an interface between a first isotropic optical medium having a first refractive index and a second isotropic optical medium having a second refractive index lower than said first refractive index at an incident angle substantially equal to the Brewster angle so that the light beam is substantially totally transmitted through said interface; and making the other light beam incident upon said interface at an incident angle equal to or greater than the critical angle so that the light beam is substantially totally reflected by said interface.

2. A method according to claim 1, wherein at least three light beams which propagate with a small angle therebetween and wherein at least two of said light beams are plane-polarized, are separated by at least two interfaces arranged one behind the other in the propagating direction of said light beams in such a manner that each of said plane-polarized light beams is made incident upon a respective interface which is set at an angle substantially equal to the Brewster angle for that light beam so that substantially all of that light beam is transmitted and the other remaining light beams are set at angles equal to or greater than the critical angle.

3. A method according to claim 2, wherein said at least three light beams comprise a first light beam, a second light beam, and a third light beam and said three light beams are separated by said two interfaces in such a manner that said first light beam of said three light beams is made incident upon a first interface of said two interfaces at an incident angle substantially equal to the Brewster angle and said second and third light beams are made incident upon said first interface at incident angles greater than the critical angle, and thereafter said second light beam is made incident upon the remaining second interface at an incident angle substantially equal to the Brewster angle and said third light beam is made incident upon said second interface at an incident angle equal to or greater than the critical angle.

4. A method according to claim 1, wherein said light beams are P-polarized light beams.

5. A method according to claim 1, wherein said first optical medium is a glass and said second optical medium is air.

6. A method of separating at least a plane-polarized first light beam and a second light beam which propagate in substantially the same direction but which propagate with a small angle therebetween, comprising:

providing an isotropic first optical medium which lies between a second optical medium having a first refractive index and a third optical medium having a second refractive index lower than said first refractive index;

said first optical medium comprising at least one thin film having a refractive index higher than that of said second optical medium;

making said first light beam incident upon said first optical medium at an angle substantially equal to the Brewster angle so that the light beam is substantially totally transmitted through said first optical medium; and making the second light beam incident upon first optical medium at an incident angle greater than the critical angle so that the light beam is totally reflected by said first optical medium.

7. A method according to claim 6, wherein said first optical medium is provided with a three-layer thin film consisting of a first layer having a refractive index higher than that of said second optical medium, a second layer having a refractive index lower than that of said first layer and a third layer having a refractive index higher than that of said second layer.

8. A method according to claim 6, wherein said first optical medium is provided with a five-layer thin film consisting of a first layer having a refractive index higher than that of said second optical medium, a second layer having a refractive index lower than that of said first layer, a third layer having a refractive index higher than that of said second layer, a fourth layer having a refractive index lower than that of said third layer and a fifth layer having a refractive index higher than that of said fourth layer.

* * * * *